(12) United States Patent
Yoshida (10) Patent No.: US 9,527,544 B2
(45) Date of Patent: Dec. 27, 2016

(54) VEHICLE BODY FRAME STRUCTURE OF MOTORCYCLE

(71) Applicant: SUZUKI MOTOR CORPORATION, Hamamatsu (JP)

(72) Inventor: Takeshi Yoshida, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/747,185

(22) Filed: Jun. 23, 2015

(65) Prior Publication Data

US 2015/0367905 A1 Dec. 24, 2015

(30) Foreign Application Priority Data

Jun. 24, 2014 (JP) ................. 2014-129202

(51) Int. Cl.
*B62K 11/04* (2006.01)
*B62K 19/08* (2006.01)
(Continued)

(52) U.S. Cl.
CPC ........... *B62K 11/04* (2013.01); *B62K 19/08* (2013.01); *B62K 19/30* (2013.01); *B62K 19/32* (2013.01)

(58) Field of Classification Search
CPC ................... B62K 11/04; B62K 19/20
See application file for complete search history.

(56) References Cited

U.S. PATENT DOCUMENTS

| 4,809,999 A * | 3/1989 | Tozawa | B62K 11/04 180/219 |
| 7,264,072 B2 * | 9/2007 | Yoshikawa | F02M 35/04 123/184.21 |

(Continued)

FOREIGN PATENT DOCUMENTS

| EP | 0330557 A2 | 8/1989 |
| EP | 1403177 A2 | 3/2004 |

(Continued)

OTHER PUBLICATIONS

Japanese Office Action dated Jan. 5, 2016, issued in corresponding Application No. 2014-129202.

(Continued)

*Primary Examiner* — Kevin Hurley
(74) *Attorney, Agent, or Firm* — Troutman Sanders LLP (57) ABSTRACT

A vehicle body frame structure of a motorcycle includes: a head frame including right and left frame parts that extend downward and rearward while widening at a rear of a head pipe; right and left tank rails that are joined to rear ends of the frame parts and extend downward and rearward; and a body frame that is joined to rear ends of the right and left tank rails and supports swing arms. The head frame has a hollow closed cross section structure from the rear end of one of the frame parts to the rear end of the other of the frame parts via a coupling part, and has an engine bracket part having an open cross section structure integrally molded at a lower portion of the frame part. Further, the tank rail has a hollow closed cross section structure from its front end to its rear end, and a lower portion of the tank tail has an open cross section structure in a region except the front and rear ends of the tank rail and is also integrally molded with an engine bracket part having an open cross section structure.

4 Claims, 11 Drawing Sheets (51) Int. Cl.
*B62K 19/30* (2006.01)
*B62K 19/32* (2006.01)

(56) References Cited

U.S. PATENT DOCUMENTS

| | | | |
|---|---|---|---|
| 7,490,689 B2 | 2/2009 | Seki et al. | |
| 7,726,382 B2 | 6/2010 | Suzuki et al. | |
| 7,845,451 B2* | 12/2010 | Morita | B62K 11/04 |
| | | | 180/219 |
| 8,550,200 B2* | 10/2013 | Hori | B62K 11/04 |
| | | | 180/219 |
| 9,284,926 B2* | 3/2016 | Miki | B62K 11/04 |
| 2011/0278085 A1 | 11/2011 | Hori et al. | |

FOREIGN PATENT DOCUMENTS

| | | |
|---|---|---|
| JP | H111192 A | 1/1999 |
| JP | 2003170882 A | 6/2003 |
| JP | 2006281913 A | 10/2006 |
| JP | 2007144500 A | 6/2007 |
| JP | 2011240774 A | 12/2011 |

OTHER PUBLICATIONS

Japanese Office Action dated May 10, 2016, issued in corresponding Japanese Patent Application No. 2014-129202.
German Office Action dated May 17, 2016, issued in the corresponding German Patent Application No. 102015110085.1.

* cited by examiner

VEHICLE BODY FRAME STRUCTURE OF MOTORCYCLE

CROSS-REFERENCE TO RELATED APPLICATIONS

This application is based upon and claims the benefit of priority of the prior Japanese Patent Application No. 2014-129202, filed on Jun. 24, 2014, the entire contents of which are incorporated herein by reference.

BACKGROUND OF THE INVENTION

Field of the Invention

The present invention relates to a vehicle body frame structure of a motorcycle.

Description of the Related Art

A vehicle body frame structure of a motorcycle in which a pair of right and left front frames being aluminum die cast or aluminum casting including a head pipe are integrated by bolt coupling and a tank rail being an aluminum extrusion molding is bolt-coupled to the front frame to reduce the weight and cost of the whole frame, is disclosed, for example, in Patent Document 1.

[Patent Document 1] Japanese Laid-open Patent Publication No. 2003-170882

However, in the vehicle body frame structure of a motorcycle disclosed in Patent Document 1, the front frame is in an open cross section structure and thus may fail to ensure strength and stiffness as the vehicle body frame.

Further, the vehicle body frame structure of a motorcycle disclosed in Patent Document 1 is configured such that the tank rail is placed adjacent to a plate-shaped portion of the front frame and bolt-coupled thereto (see FIG. 3 in Patent Document 1), and is thus difficult to increase the joint strength between the front frame and the tank rail.

Further, in the vehicle body frame structure of a motorcycle disclosed in Patent Document 1, it is not considered that the tank rail suspends an engine.

SUMMARY OF THE INVENTION

The present invention has been made in consideration of the above points, and an object thereof is to ensure the strength and stiffness as a vehicle body frame while reducing its weight. Another object is to increase the joint strength between a head frame and a tank rail.

A vehicle body frame structure of a motorcycle of the present invention, includes: a head frame including right and left frame parts that extend downward and rearward while widening at a rear of a head pipe; right and left tank rails that are joined to rear ends of the frame parts and extend downward and rearward; and a body frame that is joined to rear ends of the right and left tank rails and supports swing arms, wherein: the frame part includes a closed cross section structure and also includes an open cross section structure at a part thereof in a longitudinal direction; and the tank rail includes a closed cross section structure and also includes an open cross section structure at a part thereof in a longitudinal direction.

Another characteristic of the vehicle body frame structure of a motorcycle of the present invention is that at a joint part of the frame part and the tank rail, both of the frame part and the tank rail have the closed cross section structure.

Another characteristic of the vehicle body frame structure of a motorcycle of the present invention is that the closed cross section structure continues from the frame part to a pivotal support part for the swing arm of the body frame via the tank rail.

Another characteristic of the vehicle body frame structure of a motorcycle of the present invention is that each of the open cross section structure of the frame part and the open cross section structure of the tank rail is used as an engine suspension part.

Another characteristic of the vehicle body frame structure of a motorcycle of the present invention is that each of the open cross section structure of the frame part and the open cross section structure of the tank rail is integrally molded with a reinforcing rib.

Another characteristic of the vehicle body frame structure of a motorcycle of the present invention is that the open cross section structure of the frame part and the open cross section structure of the tank rail are located in front and rear of the joint part of the frame part and the tank rail, and located ahead of a joint part of the tank rail and the body frame.

DETAILED DESCRIPTION OF THE PREFERRED EMBODIMENTS

Hereinafter, a preferred embodiment of the present invention will be described referring to the accompanying drawings. In this application, directions of front, rear, right, and left are directions based on a motorcycle, and a front and a rear of a vehicle are indicated by an arrow Fr and an arrow Rr as necessary.

Figure 1:
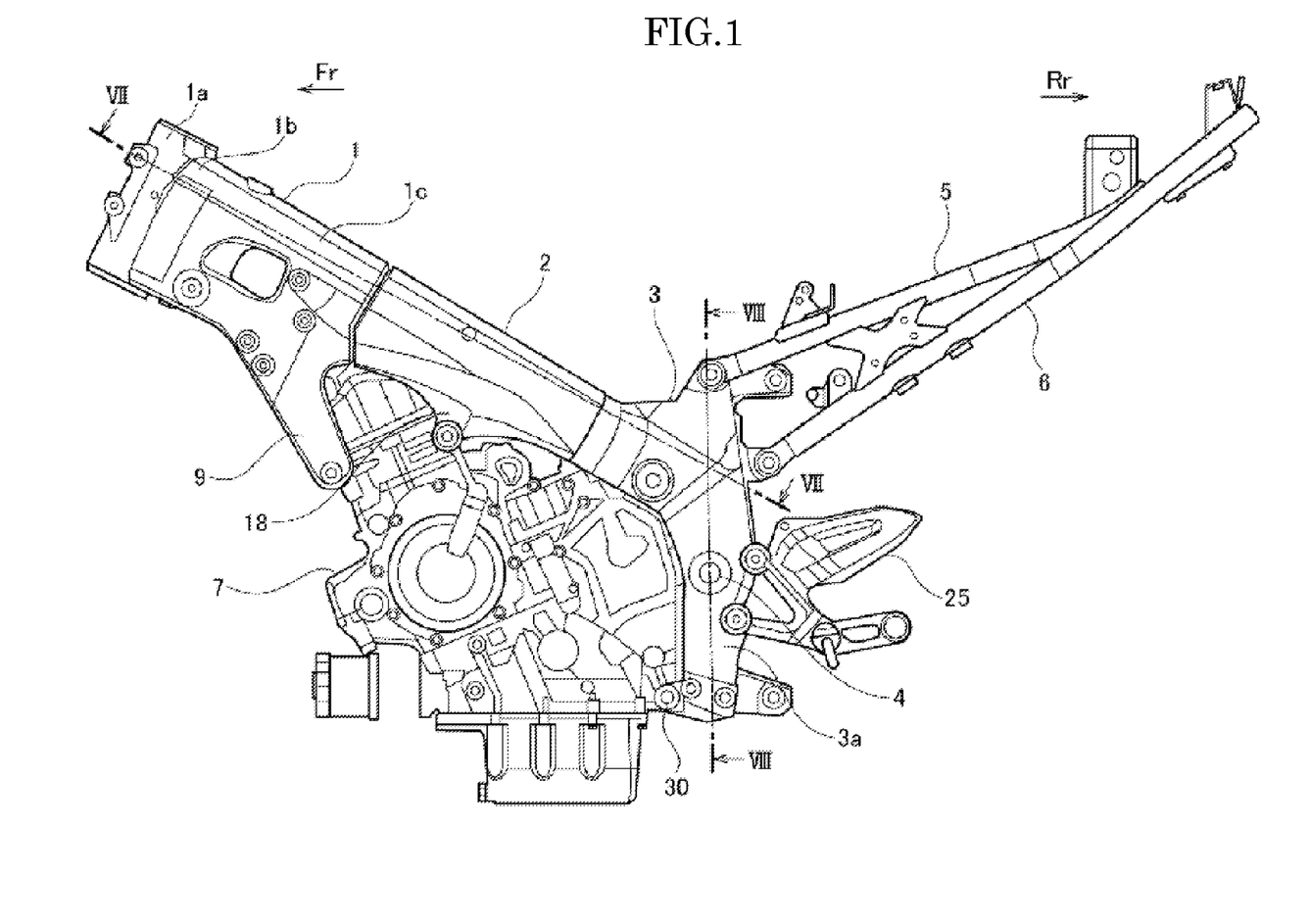
FIG. 1 is a side view illustrating a part of a motorcycle including a vehicle body frame structure according an embodiment.
Figure 2:
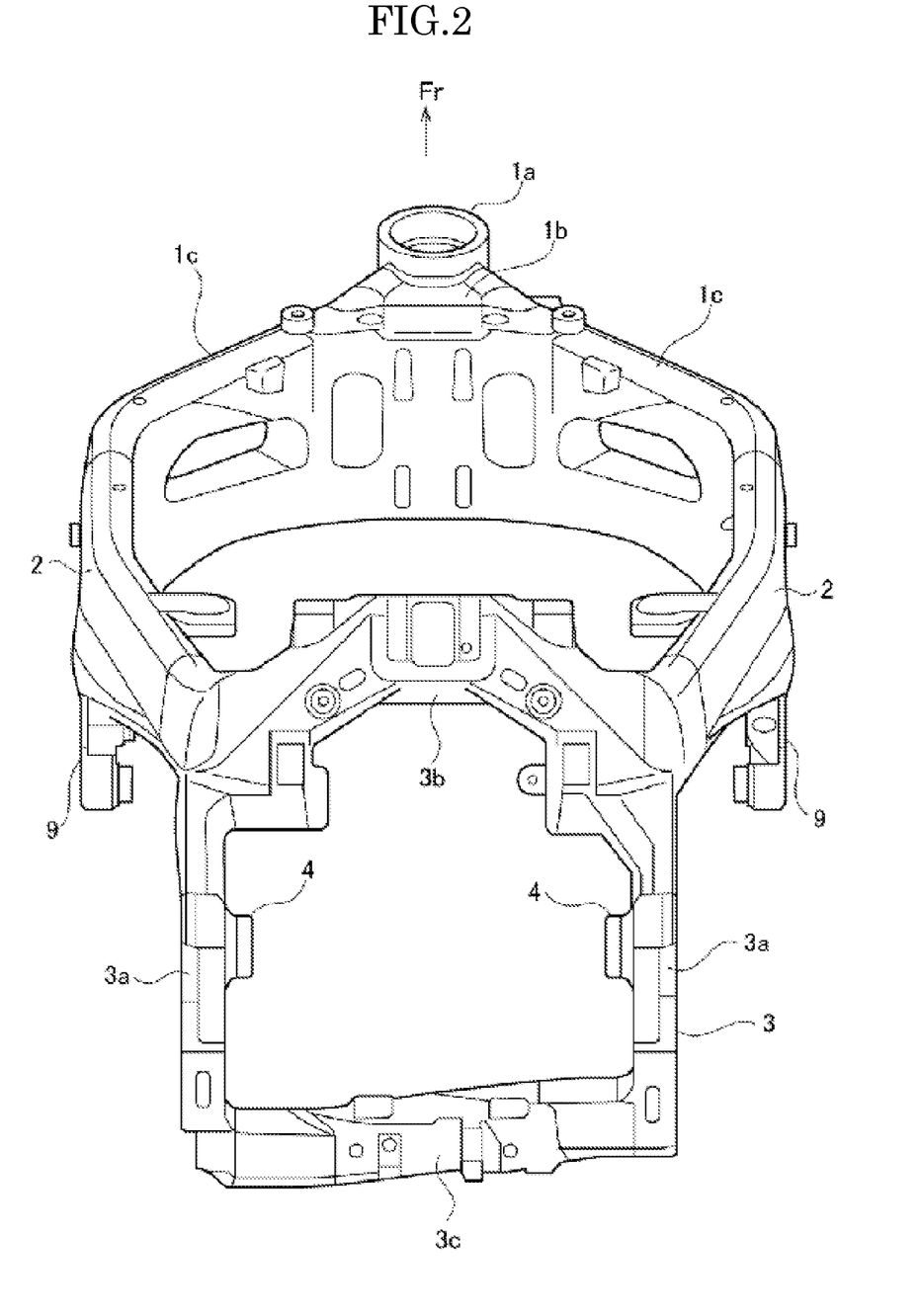
FIG. 2 is a rear perspective view of the vehicle body frame structure according the embodiment.

As illustrated in FIG. 1 and FIG. 2, a head frame 1 is provided which includes a head pipe 1a for supporting a not-illustrated front fork and has right and left frame parts 1c that extend downward and rearward while widening at the rear of the head pipe 1a.

Further, right and left tank rails 2 are provided which are joined to rear ends of the frame parts 1c of the head frame 1 and extend downward and rearward.

Further, a body frame 3 is provided which is joined to rear ends of the right and left tank rails 2. The body frame 3 is provided with pivot parts 4 being pivotal support parts for not-illustrated rear swing arms. Further, to a rear portion of the body frame 3, a pair of right and left seat rails 5 and backstays 6 are coupled which extend obliquely upward to the rear.

By a vehicle body frame constituted as described above, an engine unit 7 is suspended. As a vehicle body frame structure of the motorcycle according to this embodiment, a diamond frame structure is employed in which a frame member extending around a lower portion of the engine unit 7 is omitted and the engine unit 7 itself is used as a strength member.

Hereinafter, structures of the head frame 1, the tank rail 2, and the body frame 3 constituting the vehicle body frame will be described in detail also referring to FIG. 3 to FIG. 11.

In the head frame 1, the head pipe 1*a*, a coupling part 1*b* provided at a rear portion of the head pipe 1*a*, and the right and left frame parts 1*c* that branch off from the coupling part 1*b* into a fork shape and extend downward and rearward while widening, are integrally molded.

Figure 3:
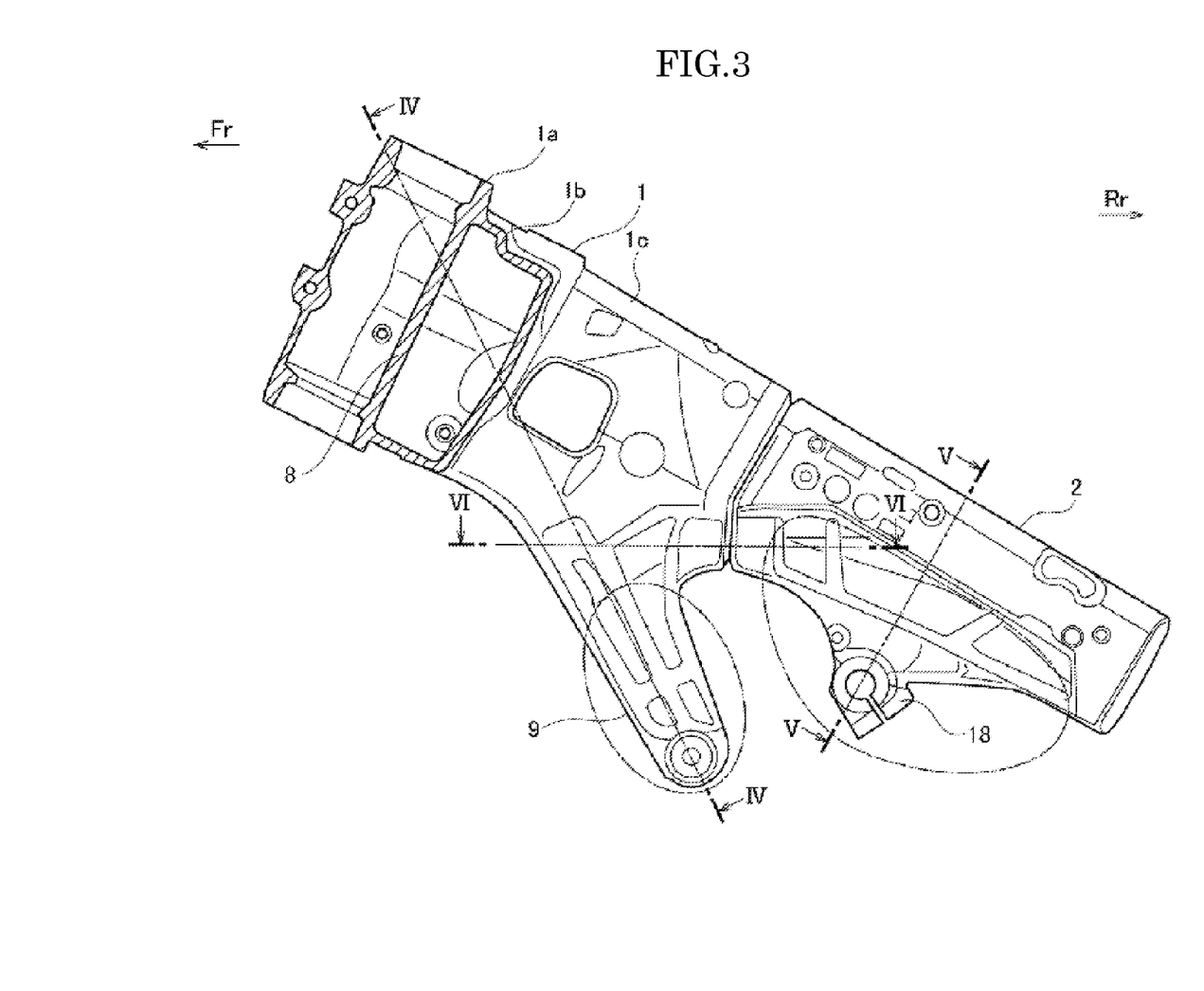
FIG. 3 is a side view illustrating a head frame and a tank rail of the vehicle body frame structure according the embodiment.

Here, the head frame 1 has a hollow closed cross section structure from the rear end of one of the frame parts 1*c* to the rear end of the other of the frame parts 1*c* via the coupling part 1*b*. Note that as illustrated in FIG. 3, the head pipe 1*a* and the coupling part 1*b* are partitioned from each other by a wall part 8.

Figure 4:
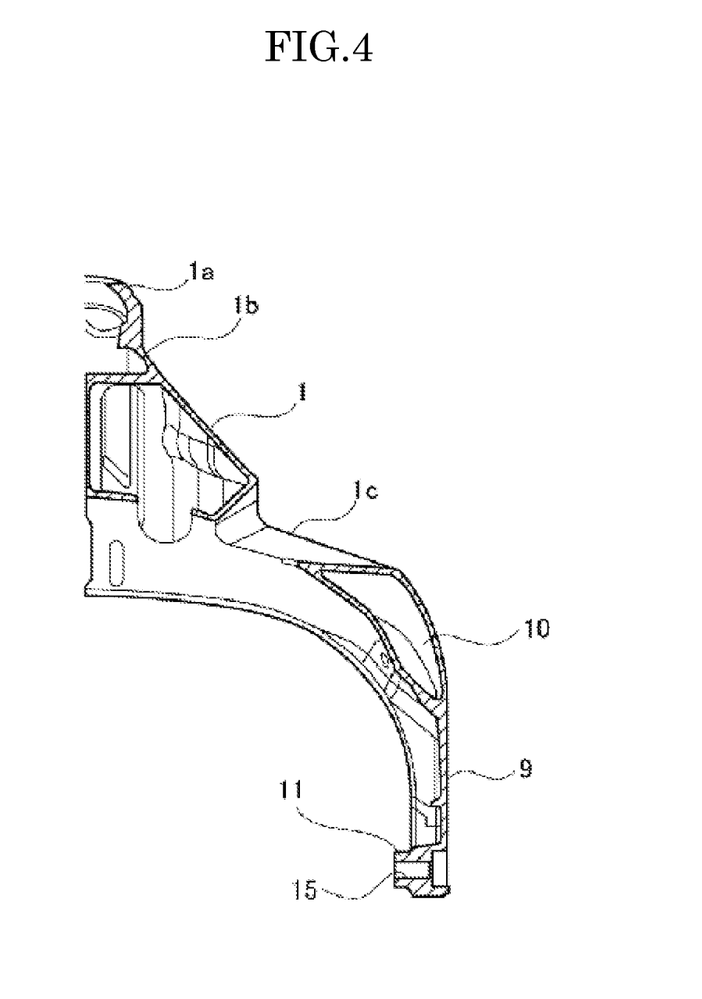
FIG. 4 is a cross-sectional view taken along a line IV-IV in FIG. 3.
Figure 6:
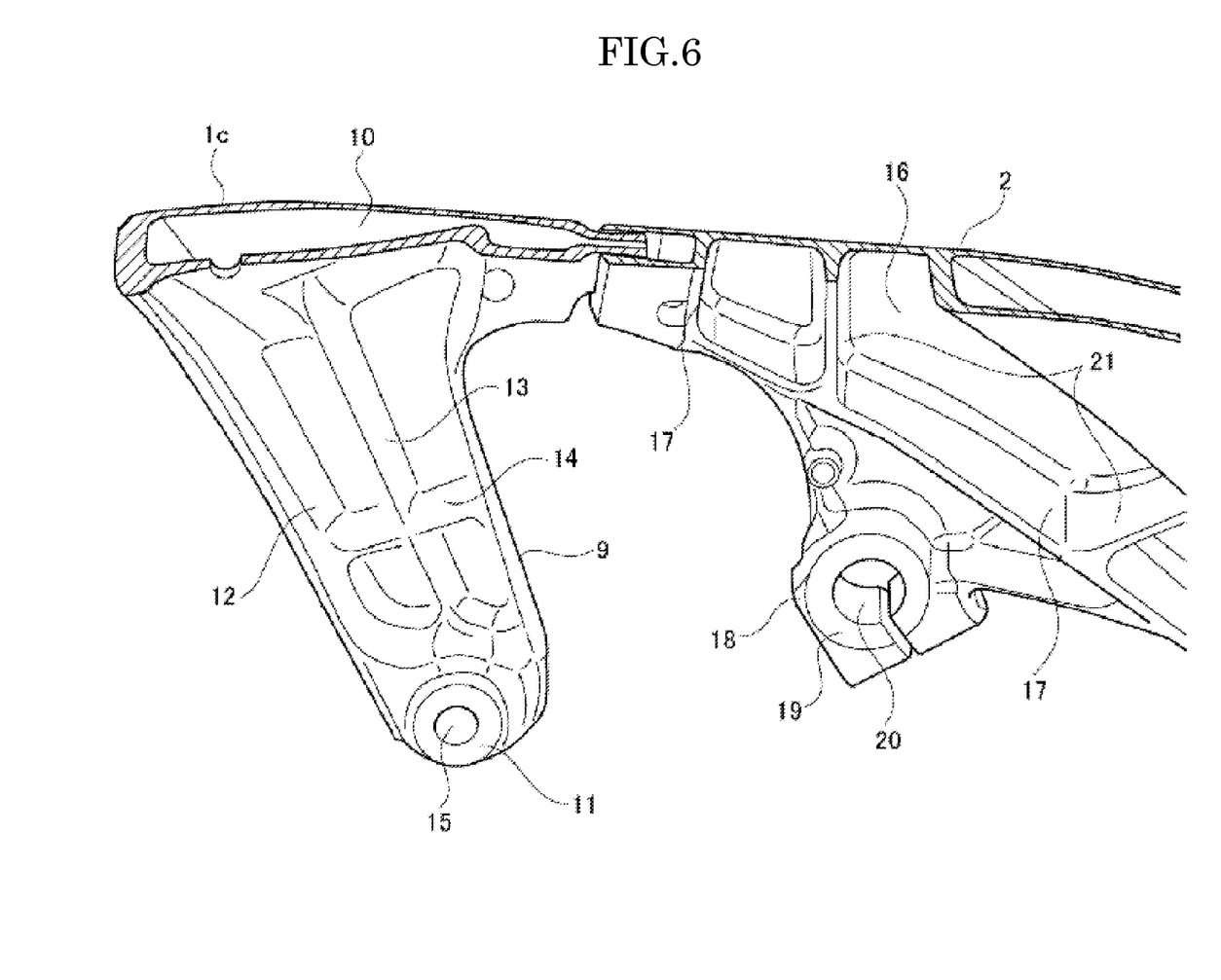
FIG. 6 is a cross-sectional view taken along a line VI-VI in FIG. 3.

Further, at a lower portion of the frame part 1*c* and at a position close to the tank rail 2, an engine bracket part 9 having an open cross section structure is integrally molded. As illustrated in FIG. 4, FIG. 6, a hollow part 10 becomes gradually narrower at a part of the lower portion of the frame part 1*c* and continues to the engine bracket part 9 in a plate shape. The engine bracket part 9 extends downward and rearward and has an engine suspension boss 11 formed at its tip. Note that an open cross section structure portion is indicated encircled in FIG. 3.

The engine bracket part 9 has a reinforcing rib 12 integrally molded at its peripheral edge, and has reinforcing ribs 13, 14 integrally molded extending in a long side direction and a width direction. The reinforcing rib 13 in the long side direction extends toward a bolt hole 15 formed in the engine suspension boss 11.

As described above, the frame part 1*c* of the head frame 1 has the closed cross section structure and also has the open cross section structure at a part thereof in the longitudinal direction. This makes it possible to reduce the weight of the head frame 1. Further, the open cross section structure is used as an engine suspension part and is fixed to the engine unit 7, so that even the open cross section structure ensures strength and stiffness.

The head frame 1 thus formed is constituted as an aluminum die cast or an aluminum casting.

The right and left tank rails 2 are joined to the rear ends of the frame parts 1*c* of the head frame 1 and extend downward and rearward.

Here, the tank rail 2 has the hollow closed cross section structure from its front end to its rear end.

Figure 5:
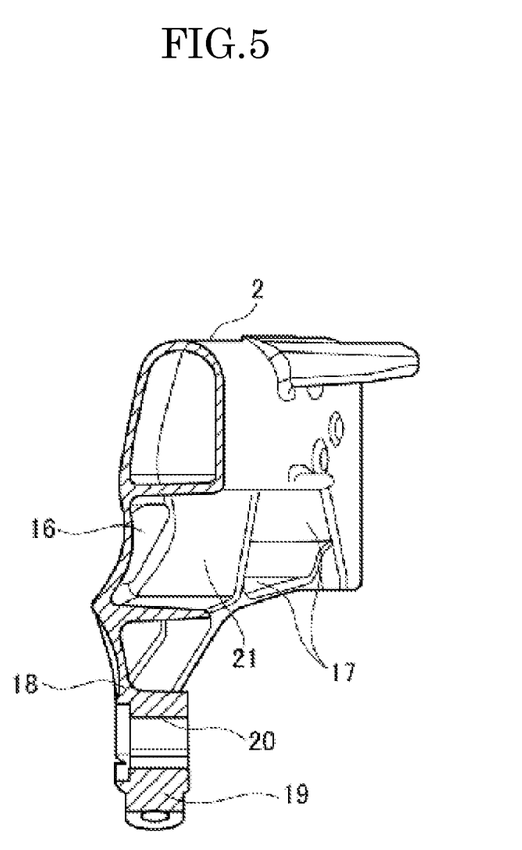
FIG. 5 is a cross-sectional view taken along a line V-V in FIG. 3.

Further, a lower portion of the tank tail 2 has an open cross section structure in a region except the front and rear ends of the tank rail 2. As illustrated in FIG. 5, FIG. 6, the open cross section structure uses a surface 16 of the tank rail 2 on the outside in the vehicle width direction as a bottom, has a peripheral wall 17 erected toward the inside in the vehicle width direction, and opens to the inside in vehicle width direction. Further, the open cross section structure of the tank rail 2 is integrally molded with an engine bracket part 18 having an open cross section structure. The engine bracket part 18 extends downward and frontward and is formed with an engine suspension boss 19. More specifically, in the tank rail 2, the lower portion of the tank rail 2 itself has the open cross section structure in the region except the front and rear ends, and has both the closed cross section structure and the open cross section structure in a transverse cross section (cross section perpendicular to the longitudinal direction). Note that an open cross section structure portion is indicated encircled in FIG. 3.

The inside of the surface 16 of the tank rail 2 is integrally molded with a pair of reinforcing ribs 21 extending toward a bolt hole 20 formed in the engine suspension boss 19.

As described above, the tank rail 2 has the closed cross section structure and also has the open cross section structure at a part thereof in the longitudinal direction. This makes it possible to reduce the weight of the head frame 1. Further, the open cross section structure is used as the engine suspension part and is fixed to the engine unit 7, so that even the open cross section structure ensures strength and stiffness. Further, the lower portion of the tank rail 2 itself has the open cross section structure, so that it becomes possible to reduce the weight while increasing a frame side view so as to suppress exposure of a built-in article.

The tank rail 2 thus formed is constituted as an aluminum die cast or an aluminum casting.

Figure 7:
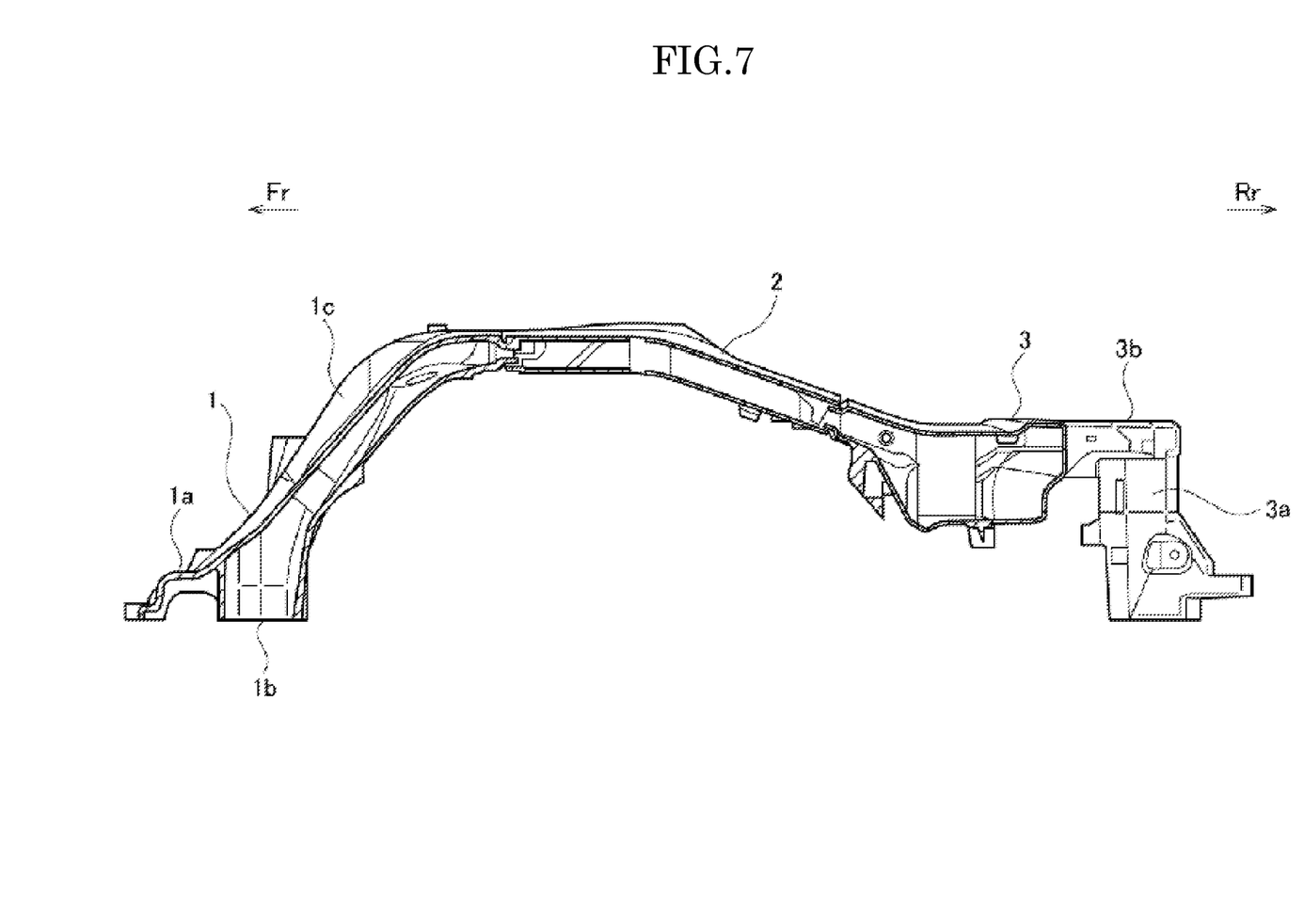
FIG. 7 is a cross-sectional view taken along a line VII-VII in FIG. 1.

As illustrated in FIG. 6, FIG. 7, at a joint part of the frame part 1*c* of the head frame 1 and the tank rail 2, both of them have the closed cross section structure. More specifically, they are welded and joined together such that the closed cross section structure at the rear end of the frame part 1*c* of the head frame 1 enters the inside of the closed cross section structure at the front end of the tank rail 2. This makes it possible to easily secure the welding length and increase the joint strength between the head frame 1 and the tank rail 2.

In the body frame 3, right and left body parts 3*a* joined to the rear ends of the right and left tank rails 2 and extending downward and rearward and then extending downward, an upper bridge part 3*b* connecting upper portions of the right and left body parts 3*a*, and a lower bridge part 3*c* connecting lower ends of the right and left body parts 3*a*, are integrally molded.

Figure 8:
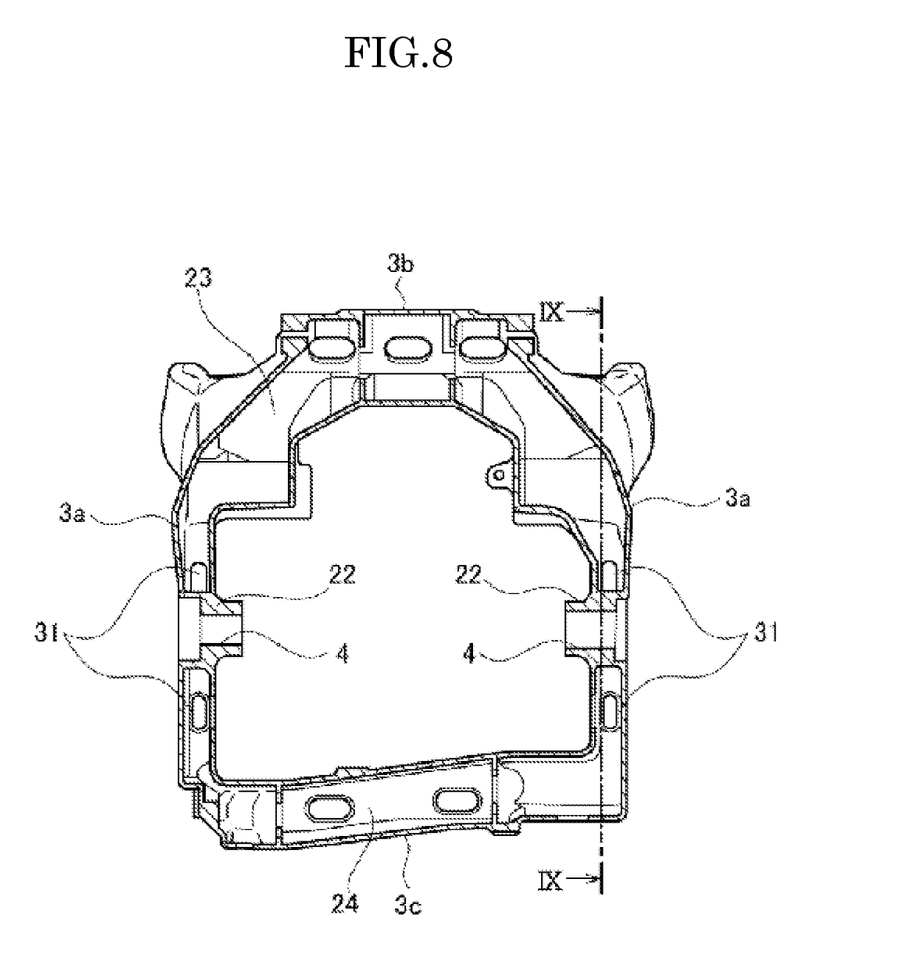
FIG. 8 is a cross-sectional view taken along a line VIII-VIII in FIG. 1.
Figure 9:
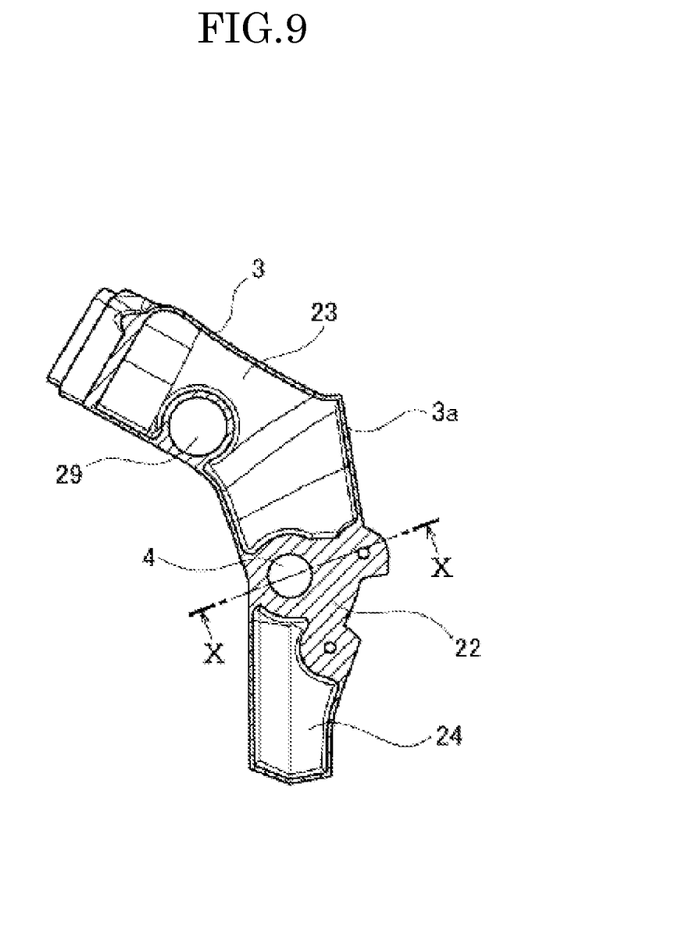
FIG. 9 is a cross-sectional view taken along a line IX-IX in FIG. 8.

Here, as illustrated in FIG. 8, FIG. 9, the body frame 3 has solid structures 22 at the middles of the right and left body parts 3*a*, and has a hollow structure 23 that continues at the upper portions of the right and left body parts 3*a* and the upper bridge part 3*b* and a hollow structure 24 that continues at the lower portions of the right and left body parts 3*a* and the lower bridge part 3*c*, at upper and lower positions across the solid structures 22. Namely, the hollow structure of the body frame 3 is divided into upper and lower parts across the solid structures 22.

Further, the pivot parts 4 are provided in the solid structures 22 of the body parts 3*a* to pivotally support the not-illustrated rear swing arms. Providing the pivot parts 4 in the solid structures 22 makes it possible to impart high stiffness to the peripheries of the pivotal support parts for the swing arms.

Figure 10:
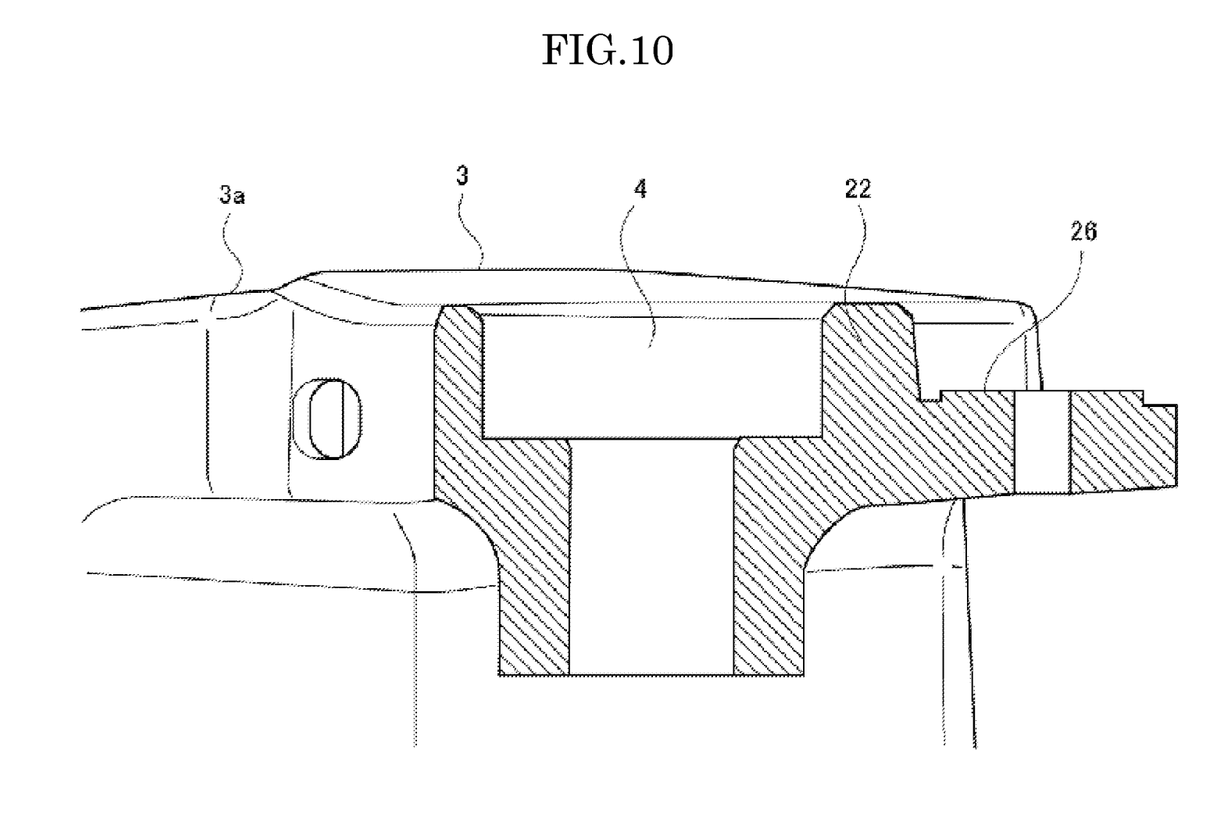
FIG. 10 is a cross-sectional view taken along a line X-X in FIG. 9.
Figure 11:
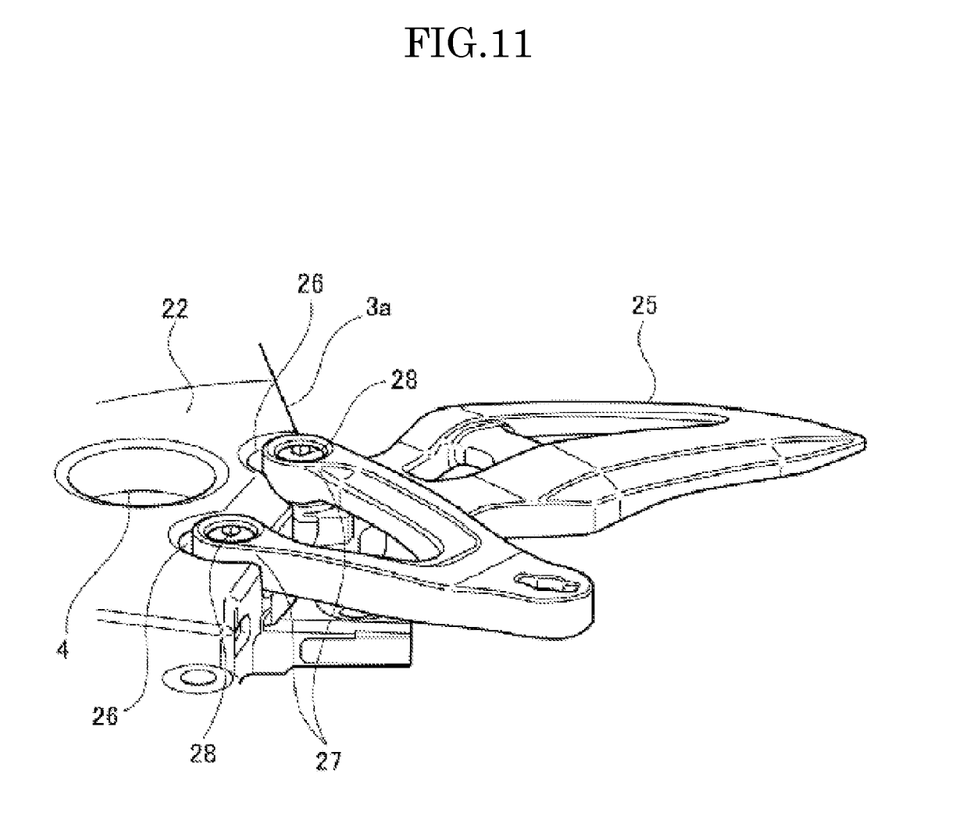
FIG. 11 is a perspective view illustrating a foot rest and its surroundings.

Further, as illustrated in FIG. 10, FIG. 11, to the solid structure 22 of the body part 3*a*, a foot rest 25 is attached. At two upper and lower places of a rear portion of a surface on the outside in the vehicle width direction of the solid structure 22 of the body part 3*a*, recessed parts 26 opening at rear portions are formed. The recessed parts 26 are configured such that attachment parts 27 of the foot rest 25 are inserted thereinto and fastened with bolts 28. Making the surface to which the foot rest 25 is attached one step lower than the surface on the outside in the vehicle width direction of the body part 3a to thereby drive the former surface inward, thereby making it possible to accordingly remove the thickness and reduce the weight. Further, it is possible to attach the foot rest 25 such that the foot rest 25 makes no level difference with respect to the surface on the outside in the vehicle width direction of the body part 3a, thereby preventing a leg of a rider from bumping against it and improving the ride quality and external appearance.

Further, the body part 3a is formed with a hole 29 for suspending the engine unit 7. Further, the lower bridge part 3c is integrally molded with an engine bracket 30 protruding frontward.

The body frame 3 thus formed is constituted as an aluminum die cast or an aluminum casting. In this case, the body frame 3 is formed into a hollow structure by using a core, and uses separate cores at the upper and lower positions across the solid structure 22, namely, a core for molding the hollow structure 23 and a core for molding the hollow structure 24. This eliminates the need to align the cores, causing no internal level difference (thickness difference) due to positional displacement of the cores. Note that holes 31 for core prints supporting the cores are formed at appropriate places of the body frame 3.

As illustrated in FIG. 7, at the joint part of the tank rail 2 and the body part 3a of the body frame 3, both of them have the closed cross section structure. More specifically, they are welded and joined together such that the closed cross section structure at the front end of the body part 3a of the body frame 3 enters the inside of the closed cross section structure at the rear end of the tank rail 2. This makes it possible to easily secure the welding length and increase the joint strength between the tank rail 2 and the body frame 3.

In the above-described vehicle body frame structure of the motorcycle, as illustrated in FIG. 7, the closed cross section structure continues from the coupling part 1b of the head frame 1 to the solid structure 22 (pivot part 4) of the body frame 3 via the frame part 1c and the tank rail 2. In other words, a backbone portion supporting the strength from the head pipe 1a to the pivot part 4 has the closed cross section structure and thereby can ensure the strength and stiffness as the vehicle body frame.

Various embodiments of the present invention have been described, but the present invention is not limited only to the embodiments, and can be changed within the scope of the present invention.

According to the present invention, it is possible to ensure the strength and stiffness as a vehicle body frame while reducing its weight. Further, at a joint part of the frame part and the tank rail, both of them have a closed cross section structure, thereby making it possible to increase the joint strength between a head frame and a tank rail.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A vehicle body frame structure of a motorcycle, comprising:
   a head frame including right and left frame parts that extend downward and rearward while widening at a rear of a head pipe;
   right and left tank rails that are joined to rear ends of the corresponding frame parts and extend downward and rearward;
   right and left joint parts joining each of the corresponding frame parts to each the rail parts; and
   a body frame that is joined to rear ends of the right and left tank rails and supports a swing arm, wherein:
   each frame part includes a closed cross section structure and also includes an open cross section structure at a part thereof in a longitudinal direction;
   each tank rail includes a closed cross section structure and also includes an open cross section structure at a part thereof in a longitudinal direction;
   at each of the joint parts, each of the frame parts have the closed cross section structure and each of the tank rails have has the closed cross section structure;
   each of the open cross section structure of the frame part and the open cross section structure of the tank rail is used as an engine suspension part;
   the open cross section structure of each of the frame parts and the open cross section structure of each of the tank rails are located in front and rear of each of the joint parts of the frame parts and the tank rails, and located ahead of right and left second joint parts between each of the tank rails and the body frame;
   an engine bracket part having an open cross section structure is integrally molded at a lower portion of the right and the left frame parts and at a position close to the corresponding right and left tank rails, extends downward and rearward, and has an engine suspension boss formed at a tip;
   a hollow part becomes gradually narrower at a part of the lower portion of each of the right and the left frame parts and continues to the engine bracket part;
   a right and a left second engine bracket part that extends downward and frontward, has an open cross section structure, and is integrally molded to the corresponding open cross section structure of the right and the left tank rail; and
   a right and a left second engine suspension boss formed at a tip of the corresponding right and left second engine bracket part.

2. The vehicle body frame structure of a motorcycle according to claim 1, wherein
   each of the frame parts closed cross section structure continues from each of the frame parts to a pivotal support part via the corresponding tank rail,
   wherein the pivotal support part supports the swing arm.

3. The vehicle body frame structure of a motorcycle according to claim 1, wherein
   each of the open cross section structure of the frame part and the open cross section structure of the tank rail is integrally molded with a reinforcing rib.

4. A vehicle body frame structure of a motorcycle, comprising:
   a head frame, comprising:
      a right and a left frame part that extends downward and rearward while widening at a rear of a head pipe, the right and the left frame part each comprise a closed cross section structure, an open cross section structure in a longitudinal direction, and a rear end;
      a right and a left first engine bracket part that extends downward and rearward, has an open cross section structure, and is integrally molded to a lower portion of the corresponding right and left frame part; and
      a right and a left first engine suspension boss formed at a tip of the corresponding right and left first engine bracket part;

wherein the lower portion of the right and the left frame part each has a hollow portion which narrows toward the right and the left first engine bracket part;

a right and a left tank rail which extend downward and rearward, each joined to the rear end of the corresponding right and left frame parts, and the right and the left tank rail each comprise a closed cross section structure, an open cross section structure in a longitudinal direction, and a rear end, comprising;

a right and a left second engine bracket part that extends downward and frontward, has an open cross section structure, and is integrally molded to the corresponding open cross section structure of the right and the left tank rail; and     a right and a left second engine suspension boss formed at a tip of the corresponding right and left second engine bracket part;

a right and a left first joint part joining each of the corresponding right and left frame parts to each of the corresponding right and left rail parts, where the right and the left frame part comprise the closed cross section structure;

a body frame joined to the rear end of the right and the left tank rails and supports a swing arm; and a right and a left second joint parts between each of the right and the left tank rails and the body frame;

wherein the open cross section structure of each of the right and the left frame parts and the open cross section structure of each of the right and the left tank rails are located in front of and to a rear of each of the right and the left joint parts, and located ahead of the right and the left second joint parts.

\* \* \* \* \*